United States Patent [19]

Stehling

[11] Patent Number: 4,580,596

[45] Date of Patent: Apr. 8, 1986

[54] CHECK VALVE WITH DUAL LOCKING MECHANISM

[76] Inventor: Henry J. Stehling, 1101 Clear View Dr., Bedford, Tex. 76021

[21] Appl. No.: 672,743

[22] Filed: Nov. 19, 1984

Related U.S. Application Data

[63] Continuation-in-part of Ser. No. 459,025, Jan. 18, 1983, abandoned.

[51] Int. Cl.⁴ ............................................. F16K 15/18
[52] U.S. Cl. .................... 137/523; 137/543; 137/881; 251/83
[58] Field of Search ............... 251/82, 83; 137/523, 137/542, 495, 543, 878, 879, 881, 220

[56] References Cited

U.S. PATENT DOCUMENTS

| | | | |
|---|---|---|---|
| 569,921 | 10/1896 | Hubbell | 137/878 |
| 1,483,240 | 2/1924 | Olson . | |
| 1,545,821 | 7/1925 | Eubanks | 251/83 |
| 2,170,478 | 8/1939 | Long | 137/542 |
| 2,301,276 | 11/1942 | Gussick . | |
| 2,641,437 | 6/1953 | Jay . | |
| 2,688,340 | 9/1954 | Stehlin . | |
| 2,856,958 | 10/1958 | Smolensky . | |
| 3,408,040 | 10/1968 | Kraft . | |
| 3,419,040 | 12/1968 | Thibodeaux . | |
| 3,587,632 | 6/1971 | Clay | 137/543 |
| 3,707,987 | 1/1973 | Gordon | 137/543 |
| 3,983,899 | 10/1976 | Graham | 137/495 |
| 3,987,812 | 10/1976 | Nelson | 251/83 X |
| 4,453,569 | 6/1984 | Symmons | 137/879 |

FOREIGN PATENT DOCUMENTS 1600844  3/1970  Fed. Rep. of Germany ........ 251/83

Primary Examiner—Robert G. Nilson
Attorney, Agent, or Firm—Millen & White

[57] ABSTRACT

A check valve includes a housing with an inlet, outlet, and a predetermined size cavity. A spherical valve element is supported on a slidable stem which is supported by a support shaped like the valve element with a spring interposed therebetween to urge the valve element into a closed condition. A locking mechanism enables locking of the valve element in a fully open, fully closed, or unlocked free floating condition. In another aspect, the valve included a bleeder conduit to the inlet side. The invention is also the valve in combination with a fire engine pumper.

13 Claims, 15 Drawing Figures

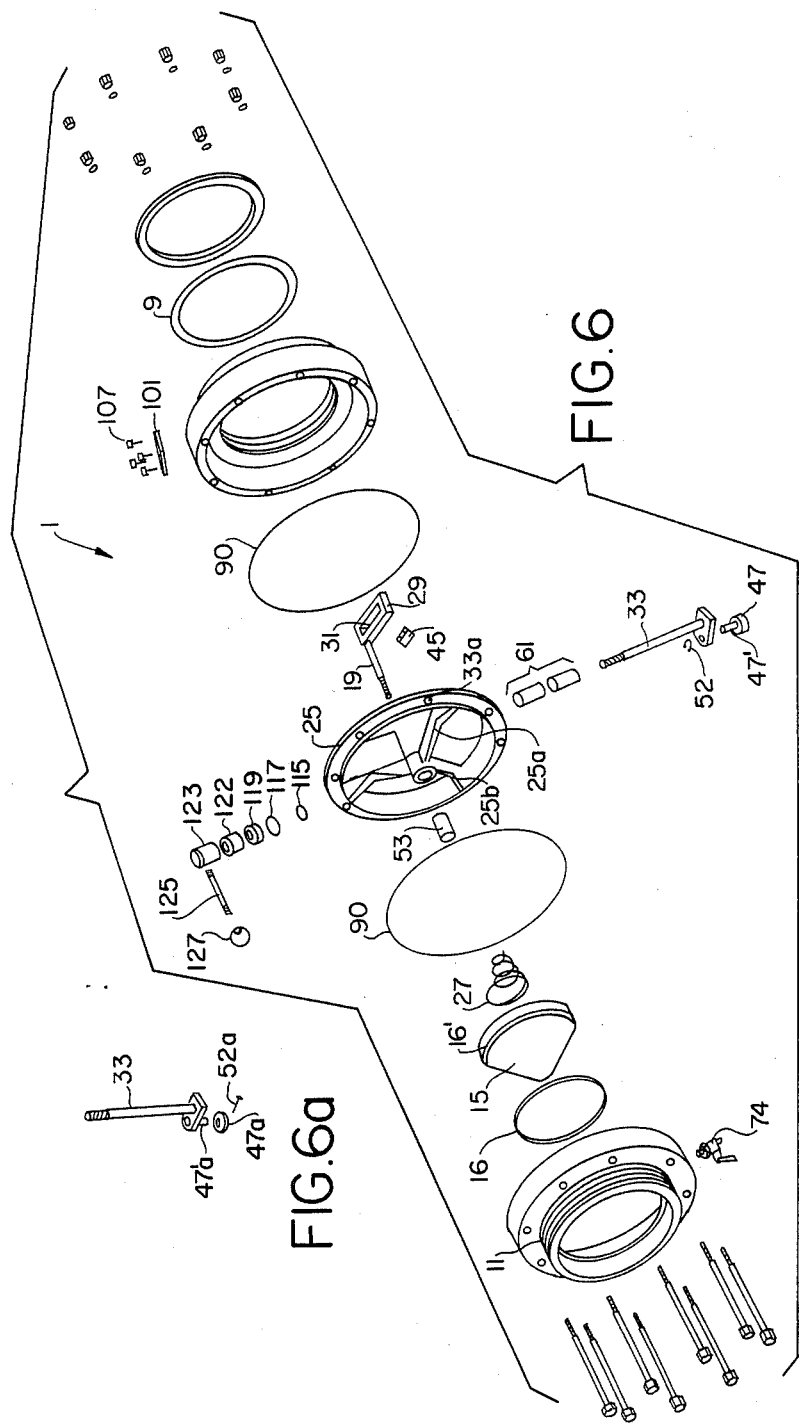

CHECK VALVE WITH DUAL LOCKING MECHANISM

This application is a continuation-in-part application of Ser. No. 459,025 filed Jan. 18, 1983 and now-abandoned.

BACKGROUND OF THE INVENTION

This invention relates to a check valve especially adapted for use on a fire engine pumper having a water reservoir with the reservoir adapted for being filled from a water source such as a fire hydrant or a large pond, i.e., a low pressure water supply.

In valves of this type, it is necessary that a large fluid flow area be provided to ensure little or no resistance to flow there-through. One such attempt at such a valve is discussed in U.S. Pat. No. 3,983,899. This valve is a spring-loaded check valve with a body having an inlet and an outlet coaxially aligned. The valve is urged closed by a check spring to ensure that the inlet fluid pressure must be sufficient to overcome any hydrostatic pressure in the fire engine reservoir before the valve will open. Furthermore, in order to prevent the check valve opening when the fire engine pumper dispenses water from the reservoir, and is not filling up the valve, it includes a locking mechanism for maintaining it closed so that the vacuum pull on the reservoir does not open it. Furthermore, by having a check spring which closes the valve, this valve reduces the "water hammer" effect which normally occurs when flow is suddenly shut off.

Nonetheless, this valve suffers from a number of disadvantages. For instance, when it becomes necessary to fill the first engine reservoir from a source of little or no water pressure, the valve will be maintained shut. Furthermore, the construction of this valve is such that after repeated openings and closings, the valve stem and body will suffer significant damage as a result of the "water hammer" effect, even though the damaging effects are reduced as compared to other valves. Moreover, when using this valve air often becomes trapped in the line between the valve and incoming water when flow is first commenced, thus creating difficulties in initial opening of the valve.

U.S. Pat. No. 2,856,958 teaches another construction of a prior art check valve. This valve includes a closing member which is urged to seal against a large inlet. However, this valve also includes all or more of the disadvantages of the above-discussed valve.

SUMMARY OF THE INVENTORS

It is thus an object of the present invention to provide a check valve especially adapted for use with a fire engine pumper.

It is another object to provide a check valve which is adapted for use with a fire engine pumper which enables the pumper reservoir to be filled either from a positive water pressure source sufficient to open the check-valve, or from a water source having little or no pressure.

Still another object of the invention is to provide a check valve adapted for reducing damaging effects of pressure surges such as a "water hammer effect".

Upon further study of the specification and appended claims, further objects and advantages of this invention will become apparent to those skilled in the art.

In accordance with the invention the valve includes a main housing having a cavity wherein the valve closing member or valve element is housed and supported for coaxial movement with a coaxially aligned inlet and outlet. This valve member is shaped like a section of a sphere, the radius of curvature of which is sufficient to support the valve member against the inlet walls to prevent it from being blown out of the valve housing upon occurrence of pressure surges such as a "water hammer effect".

The valve member is spring loaded to be urged into a closed position whereby a minimum predetermined water pressure is required on the inlet side to force the valve to open. In one aspect, the valve member is supported on a valve stem which is slidable through a sleeve on a valve stem support member which is shaped like the valve member, whereby the valve member has stresses uniformly distributed thereon in the fully open position as a result of the valve stem support member cooperating with the spring urging the valve member shut. Moreover, the spring is such as to bear over the surface of both the support and valve element when the valve is fully open.

A locking mechanism is provided adapted for (1) locking the valve member in a closed position, (2) locking the valve member in a fully open position to achieve full open draft with little or reduced frictional losses, and (3) maintaining the valve member in a free-floating condition whereby the valve member will open when the pressure on the inlet side is sufficient to overcome the force exerted by the spring urging the valve member into the closed position. Typically, in one aspect of the invention this locking mechanism will be a modified scotch yoke. A fixed sleeve permits the valve stem to slide through it and is urged by a second spring toward a cam member connected to the valve stem whereby the sleeve locks the cam member against movement when rotated into its extreme position of rotation in the locked shut position. Intermediate its extreme positions, the valve stem slides freeely inside the sleeve permitting free-floating movement of the valve.

In a more preferred embodiment, the sleeve is not necessary since it has been found that the locking mechanism will be retained at its extreme locked positions of its own inertia.

In still another aspect, the valve includes a bleeder mechanism which passes through the valve housing, but not through the valve cavity, from the connecting inlet side of the valve to the exterior to permit bleeding off of air in a conduit connected to the inlet side, or of water when it is desired to disconnect the conduit to prevent excess pressure from spraying water over the person disconnecting the conduit, i.e., hose. A selectively controllable valve is provided in the bleeder mechanism for this purpose.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 6 is an exploded view in perspective of the preferred embodiment of the invention of FIG. 5 showing the elements of the valve of FIG. 5;

FIG. 6a is a view of an alternative construction of the shaft wrist pin arrangement;

DETAILED DISCUSSION OF THE INVENTION

Figure 1:
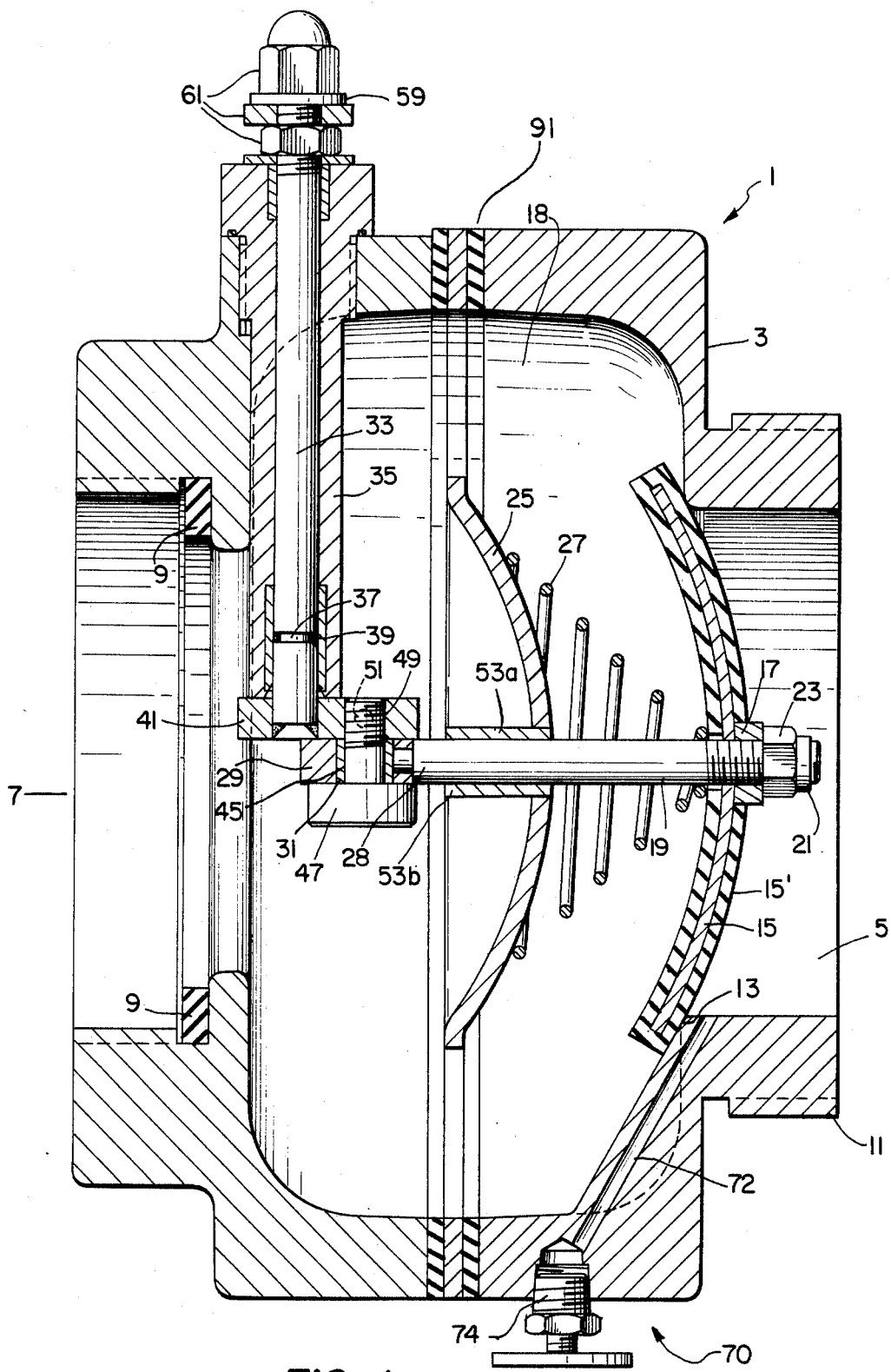
FIG. 1 is a cross-sectional side view of a first embodiment of the valve according to the invention, showing essentially all of the working components thereof.

In FIG. 1 there is generally illustrated the check valve 1 in accordance with the invention. This valve is of the same general type as the valve described in U.S. Pat. No. 3,983,899, whose disclosure is specifically incorporated by reference herein.

The valve 1 of FIG. 1 includes a housing 3 having an inlet 5 and an outlet 7. The outlet 7 is open and is adapted for connection in a fire engine pumper, and includes sealing member 9, such as a gasket, to prevent leakage when mounted on a fire engine pumper. The inlet 5 side of the valve is typically screw threaded 11 for having a conduit, such as a hose, connected thereto. Alternatively, an adapter, for example, one known in the trade by the name, "Storz adapter", can be attached which permits one step clamping on and unclamping of a conduit such as a hose.

Sealing against the walls 13 of the inlet opening 5 is a valve element 15 having a shape like a section of a sphere. Preferably, the valve element is made of cold rolled steel with a reinforcing cold rolled steel sleeve 17 welded thereon at an opening in the center of the valve element 15. This valve element 15 is covered with a neoprene rubber sheath 15' to ensure the proper seating and sealing against the inlet openings walls 13. However, it should be noted that the invention is not limited to these materials, and other equivalent materials can be employed as will be well known to those of ordinary skill in the art.

The valve element 15 is movable between a locked closed and a locked open position, or can be in a free floating condition by means of a valve movement control arrangement which will be described hereinafter. The valve housing 3 has a cavity 18 of a cross-sectional area greater than a cross-sectional area of the valve element 15 by an amount at least as great as the area of the inlet for avoiding restricting the flow of fluids therethrough.

Referring to the valve movement control arrangement, the valve element 15 is supported on a slidable valve stem 19 having a threaded end 21 at the inlet side whereby the valve element 15 is secured thereon by means of a nylon insert lock nut 23. The valve stem 19 is slidably supported on a valve support member 25 through a sleeve 53 which is fixed to the valve support member. The portion of the valve support member 25 which is aligned with the valve element 15 is shaped substantially the same as the valve element 15.

A spring 27 is supported between the valve element 15 and the valve support member 25 around the valve stem 19, and urges the valve element 15 into a closed position with a constant predetermined force. The spring constant of the spring 27 is selected in accordance with the minimum amount of pressure desired on the inlet side of the valve 1 to force open the valve element 15. The selection of the spring is conventional and known to those skilled in the art.

It is to be noted that in this embodiment the spring 27 expands in diameter in the direction from the valve element 15 to the valve support member 25 to better support the valve element 15 as the spring 27 progressively contacts the greater surface area of the valve element 15, and more evenly distributes pressure on the backside of valve element 15 as it opens to prevent sidewards or wobbling movement thereof. The support member 25 which is curved in the same direction as valve element 15 also provides an additional support function as a result of its shape.

Figure 2:
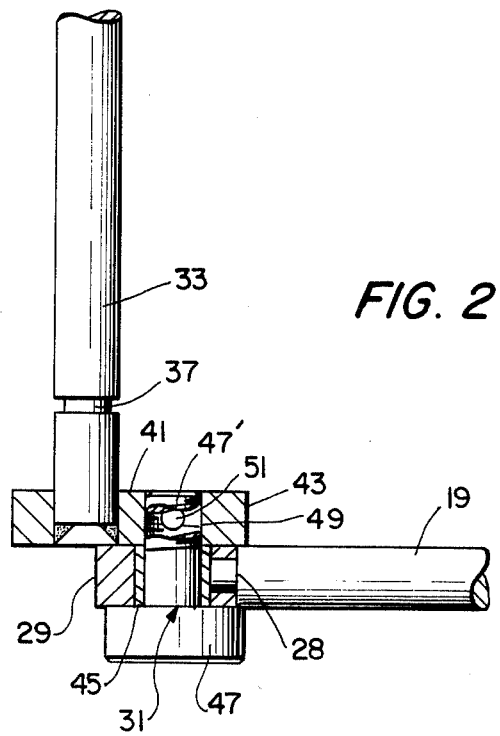
FIG. 2 is a side view of the locking mechanism, in partial section for use in all embodiments of the unit.
Figure 3:
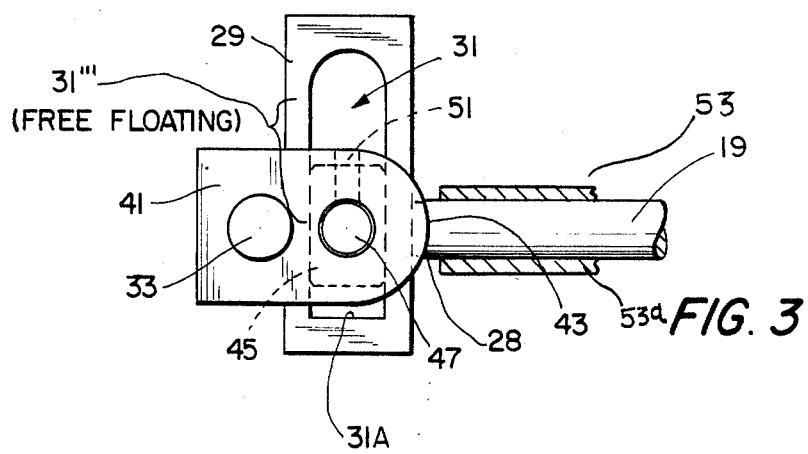
FIG. 3 is a top view of the horizontally extending member of the operating shaft of the locking mechanism shown in cooperation with the other positions of the operating shaft shown in dotted lines, and various elements in partial section.

On the other side of the valve support member 25 is located the other end 28 of the valve stem 19 which, as more clearly shown in FIGS. 2 and 3, includes a sidewardly extending member, i.e., valve stem member 29 welded thereon, and having a slot 31 extending therethrough. This valve stem member 29 cooperates with other elements to make up the control and locking mechanism of the valve 1, which in this case is preferred to be a modified scotch yoke arrangement.

As shown in FIGS. 1, 2 and 3, a rotatable control operating shaft 33 extends downwardly through a guide 35 into the valve 1 body to cooperate with the valve stem member 29. The shaft 33 includes a groove 37 near the bottom thereof, but still within the guide 35, wherein is seated a gasket 39 for preventing leakage through the guide 35. At the bottom of the shaft 33, outside the guide 35, is welded a member 41 having a cam surface 43, with shaft member 41 overlapping on top of valve stem member 29.

Inside slot 31 is positioned a slide block 45 which is held therein for sliding movment by a wrist pin 47 which extends through the slide block 45 into an opening 49 in shaft cam surface member 41. The wrist pin 47 is held in shaft member 41 by means of another pin 51 extending through shaft member 41 into the shaft 47 of the wrist pin 47', as shown in FIG. 2.

In an alternative construction as better illustrated in FIG. 6a, the shaft member 41 has a downwardly extending rod member 47a' which extends through sliding block 45 and is held thereon by slide block retainer washers 47a and pin 52a. In still another alternative construction as in FIG. 6, the pin 51 is replaced by a lock ring 52.

Figure 4A:
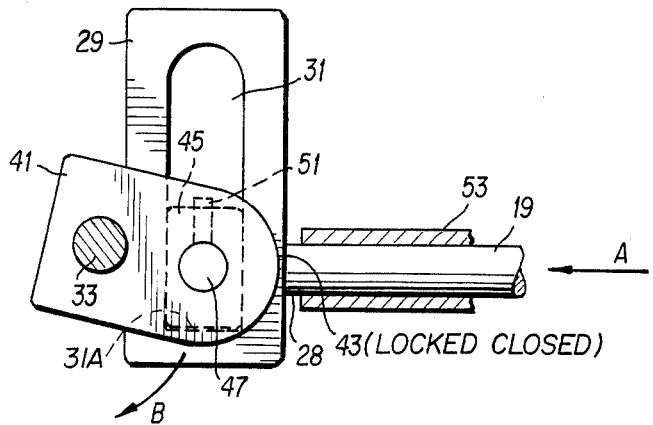
FIGS. 4A, 4B, 4C and 4D respectively show diagrammatically the locked, closed overcenter portion, two free floating positions and the locked open overcenter position.
Figure 4B:
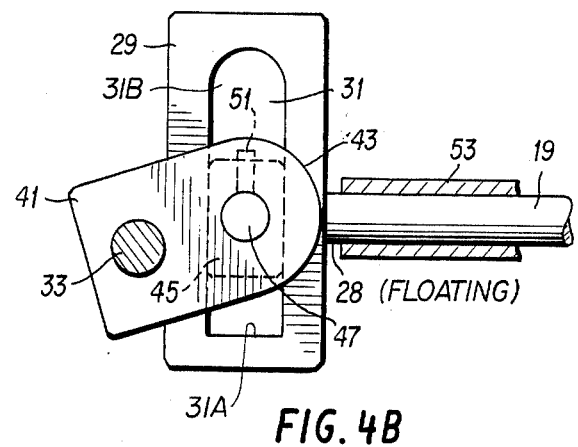
Figure 4C:
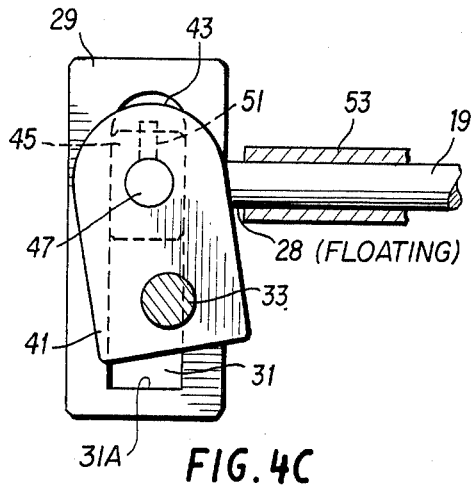
Figure 4D:
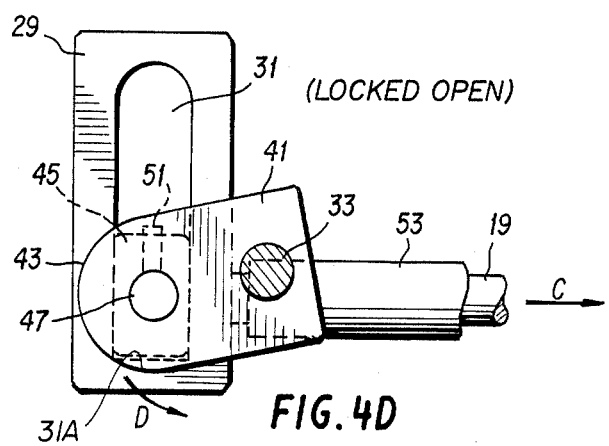

As can be appreciated from the above description, when the operating shaft is rotated in one direction, i.e., in the counter clockwise direction, as shown in the drawing, the sliding block 45 moves to the extreme end 31A of the valve stem member slot 31 (see FIG. 4D). As a result of the connection with shaft member 41, this forces the valve stem 19, to the left in FIG. 1, to the fully open locked position. When moved to the extreme end 31A of slot 31, the stem 19 is urged to the right to the fully closed locked position see FIG. 4A.

In order to lock the valve 1 in either a fully locked open or locked closed position, the slide block 45 is forced to the extreme flat end 31A of the slot 31 by the valve handle or lever 59. This provides over-center and joining action as is well known to those of ordinary mechanical skill in art of using scotch yokes which locks the valve element in either a full open or full closed locked position due to the sliding block 45 seating against the end 31A of the slot. If moved slightly in either direction from a locked closed or locked open condition, the free floating condition results. This generally corresponds to movement of slide block 45 in region 31B of slot 31.

As better illustrated in FIGS. 4A-4D, when in the locked closed position, when a force shown by arrow A is exerted to attempt to open the valve, this will have the effect of urging the member 41 into rotation in the direction of arrow B jamming the member 45 in the slot 31. When in free floating position as in FIG. 4D, the block 45 slides freely as previously noted. When in locked open position as in FIG. 4D member 41 is rotated into an over-center position behind the shaft 47 so that when a force is exerted the block 45 jams against the flat end 31A of the slot preventing the stem 19 from moving in the directon of the arrow D. In essence, whenever the bock 45 abuts the end 31A of the slot 31, the mechanism jams.

To facilitate control of the operating shaft 33, a lever 59 is attached thereto outside the valve housing 3, and secured thereto by suitable securing means 61, such as a hex nut assembly. Thus, axial movement of rod 19 follows the rotary position of elements 33 and 41. As the valve "free floats" axially, the valve lever 59 "free floats" in a rotary direction.

As an additional feature of the invention, there is provided a bleeder system 70 which includes a conduit 72 extending through housing 3 from the inlet 5 outside valve element 15 to the exterior. There is a valve 74 provided to control flow through conduit 72. The valve 74 is typically of the radiator drain cook type.

The bleeder system 70 permits release of air trapped in a hose when a hose is first connected to the valve 1 and as water flow to the valve 1 is commenced. Likewise, when flow is stopped, water pressure can be released to avoid dousing a person uncoupling a connected hose.

With respect to the spherical radius of curvature of valve element 15, it is noted that a preferred radius for typical valves dimensioned for use in fire engine pumpers is about 4.56 inches. However, this value can vary somewhat, and it is only essential that the radius of curvature be such as to provide proper seating of the valve element 15 against inlet walls 13, while at the same time being sufficient to prevent the valve element 15 from being blown out of the valve housing 3 as a result of a sudden shut-off of flow into the pumper, resulting in the excessive back-pressure build-up known as the "water hammer effect". In this regard it should be noted that the specific construction and association of spring 27 with the valve element and support aids in minimizing this effect by rapidly closing the valve element 15 upon a sudden drop in pressure in a connected hose.

As to the materials employed, unless otherwise noted, most of the valve 1 elements are made of stainless steel. However, as to the slide block 45, it is preferred that it be made of bronze or brass, and the housing itself in this embodiment is aluminum. The selection of materials being conventional, it is also noted that other equivalent materials can be employed.

In an alternative and more preferred embodiment as illustrated in FIGS. 5, 6, 6a, 7, 8, 9a-9c, like elements are designated by like reference numerals to those of FIGS. 1-3.

In the construction of the valve of FIG. 6, the construction and operation of the locking mechanism is essentially the same as in FIG. 2, with the sleeve 53 being fixedly secured to the valve support member 25.

Even if a "water hammer effect" occurs, the locking mechanism (absent being moved into either locking position by turning lever 59) will not accidentally be moved into the locked positions.

Likewise, as shown in FIG. 6, the lever 59 and securing means 62 for securing the lever 59 to the operating shaft 33 is slightly different, and is clearly illustrated in the Figure. Still further, rubber body gaskets 91 of the embodiment of FIG. 1 which are shown unnumbered in said Figure have been replaced by "O" ring type seals 90.

Figure 7:
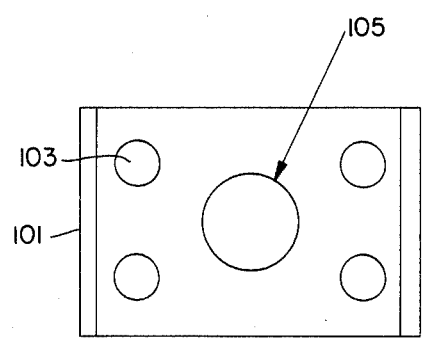
FIG. 7 is a top plan view of the valve shaft outer guide plate of the valve of FIG. 6.

As shown in FIGS. 6 and 7, the valve body includes a plate 101 secured thereto at an opening on the valve body to permit the control operating shaft 33 to extend therethrough from the interior of the valve to the exterior. The plate 101 is secured to the valve body at the top by securing means 107, such as screws, extending through openings 103. A larger opening 105 is aligned with an opening (not shown) in the valve body through which the shaft 33 extends, and at which a floating seal is provided to prevent water leakage but facilitating alignment.

As shown in FIG. 6, the valve shaft extends through two guide bushings 61 in the interior of the valve, and through a shaft seal 115 also in the interior. Extending outwardly is the end of shaft 33 through opening 105 in plate 101. A gland seal seats in opening 105 with a shaft seal gland 119 holding it in place. A handle spacer 122 provides clearance for the handle body 123 which is attached to the end of the shaft 33 and has the handle shaft 125 and knob 127 attached thereto. This seal arrangement eliminates the need for precise alignment of all elements allowing some movement while still providing a tight seal.

Figure 5:
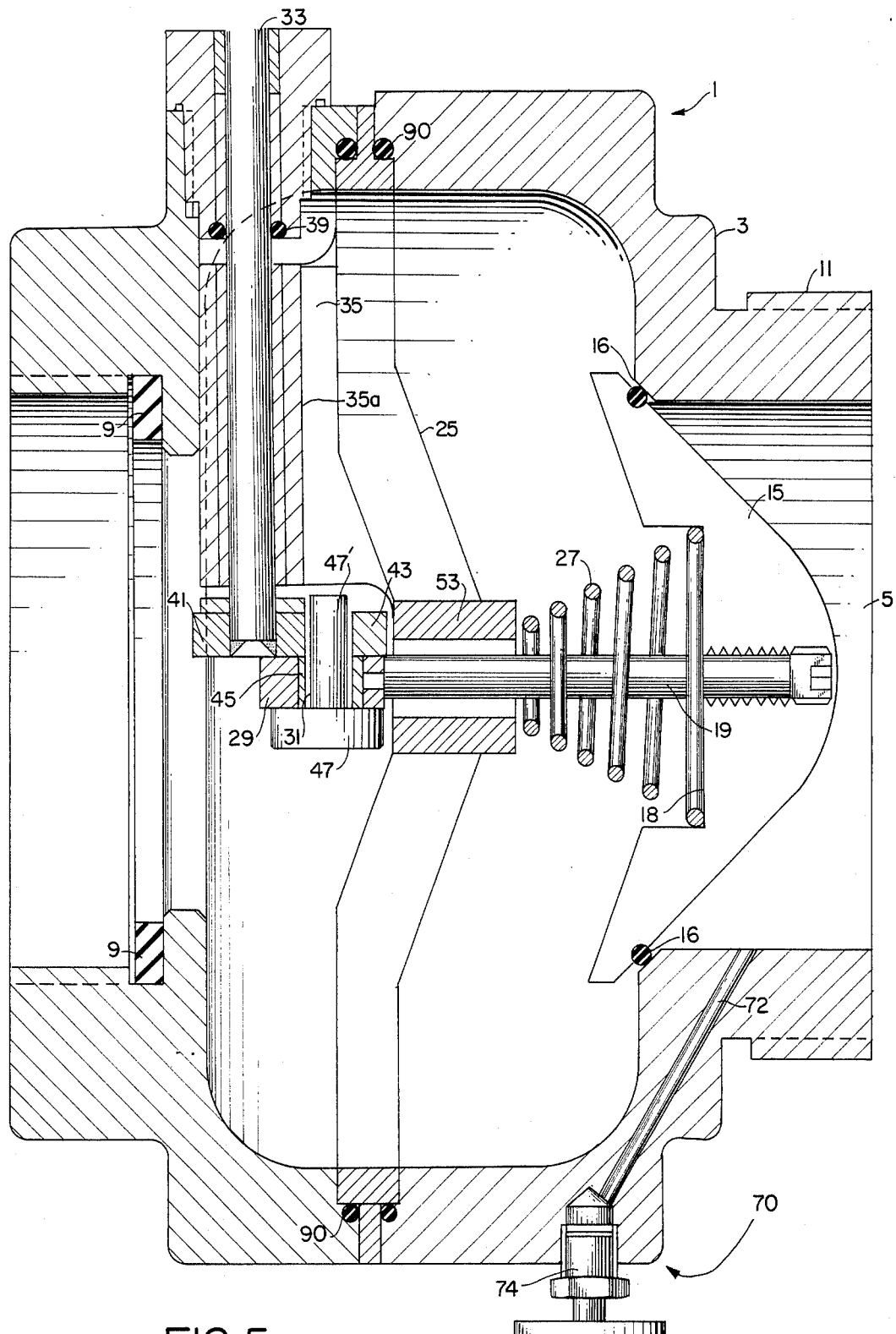
FIG. 5 is a cross-sectional side view as in FIG. 1 of a preferred embodiment of the valve of the invention.

The center support member 25 in the device of FIG. 1 is constructed of stamped steel plate having four steel arms defining four windows which in its preferred size provides about 24.6 square inches of water way. In the embodiment of FIGS. 5 and 6, the center support member 25 is constructed of aluminum alloy casting. A center bushing 25b, which holds sleeve 53, is supported by three equally shaped and spaced yokes 25a in place of the four steel arms of FIG. 1. Each spoke is streamline shaped to allow minimum resistance to water flow. Furthermore, as compared to the valve of FIG. 1, there is provided, for a comparable size valve, about 40.5 square inches of water way which creates very little turbulence. Furthermore, one spoke 25a of the center support 25 also includes integral therewith a support 35 having a shaft guide 35a for the operating shaft 33 as shown in FIGS. 5 and 6.

Figure 8:
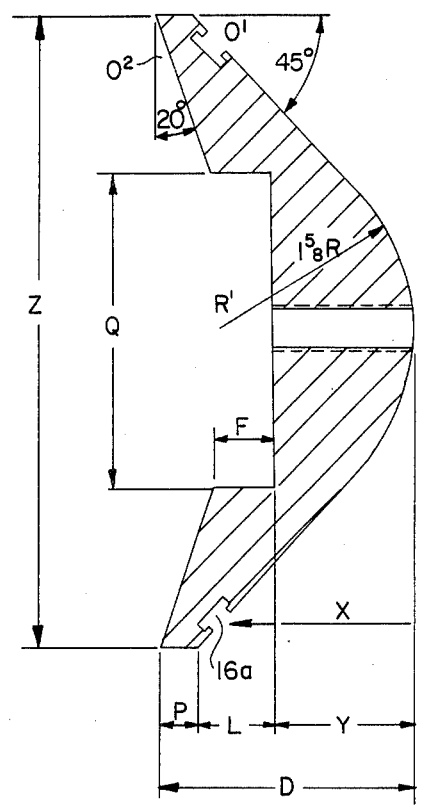
FIG. 8 is a side cross-sectional view of the valve element of FIG. 6 showing in greater detail the features thereof.

In this embodiment, as shown in FIGS. 5, 6 and 8, the valve element 15 is shaped to be streamlined, and of greater thickness in the center than at the outer periphery. This structure, in addition to providing better flow, provides as a result of its streamlined shape better low pressure sealing and will not deflect due to its thicker central region.

In a more specific aspect, the thicker region has radius of curvature $R^1$. The thinner region has complementary angles of curvature $\theta^1$ and $\theta^2$ as shown in FIG. 8 which with the thickness of the valve element 15 at the periphery add up to a 90° angle between vertical and horizontal lines to provide a greater streamlined profile toward the outer edges. As to actual dimensions, in a typical valve of a size well known to those of ordinary skill in the art, the radius of curvature $R^1$ of the thicker region will be about 1⅝ inches. As further shown in FIG. 8, the valve element 15 will have a center cut-out thicker position having a diameter Q of about 2½ inches and being cut-in by an amount F of about ½ inch. This is compared to the full diameter size Z of the element 15 of about 5 inches. The maximum thickness of the valve D is about 2 inches with the edge thickness P being about 0.3 inches. The thickness X of the thick region is about 1.2 inches and the thickness of the front edge of the thin region to the beginning of the thick region is an amount L equal to about 0.7 inches.

As illustrated, this valve body 15 is secured to valve stem 19 by being threaded thereon. A spring 27, reversed from the spring of FIG. 1, bears over a large surface of the thicker portion of valve element 15 to prevent wobbling. The smaller end of spring 27 bears for support on sleeve 53 attached to center support member 25.

The valve element 15 itself, instead of being a rubberized steel disc, is of aluminum alloy. A "O"-ring type "T" seal 16 provides sealing and replaces the rubber coating of FIG. 1. The engagement groove 16a for the "T" seal is better illustrated in FIG. 8.

In substantially all other aspects the valve of FIGS. 5, 6 and 8 operates the same as that of FIG. 1.

With respect to the constants of the spring selected, it is preferred that they be such that the valve will automatically open when a pump in the pumper truck (see FIG. 9A) exerts typically about 4–8 inches of vacuum presure.

In the FIGS. 9a–9c the valve 1 of the invention is shown being operated in a pumper truck 80 under various conditions as follows.

EXAMPLE 1

Figure 9A:
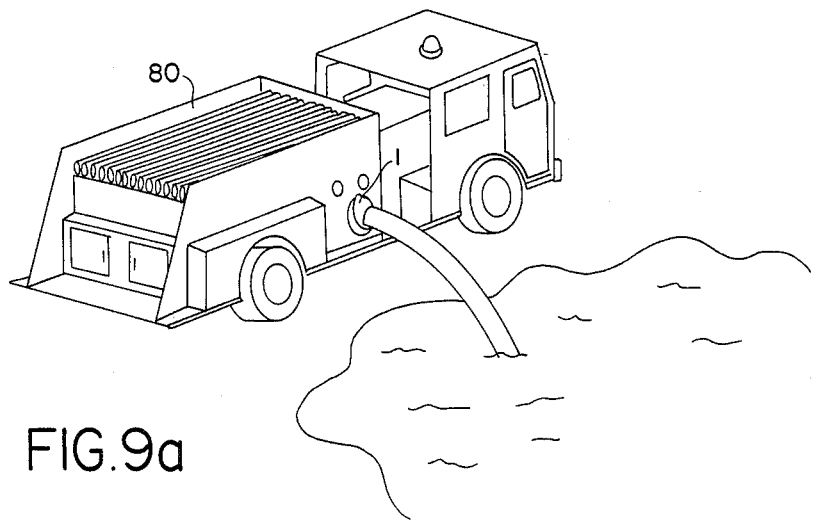
FIGS. 9a-9c illustrate schematically the various modes of operation of the valves of the invention on a pumper.
Figure 9B:
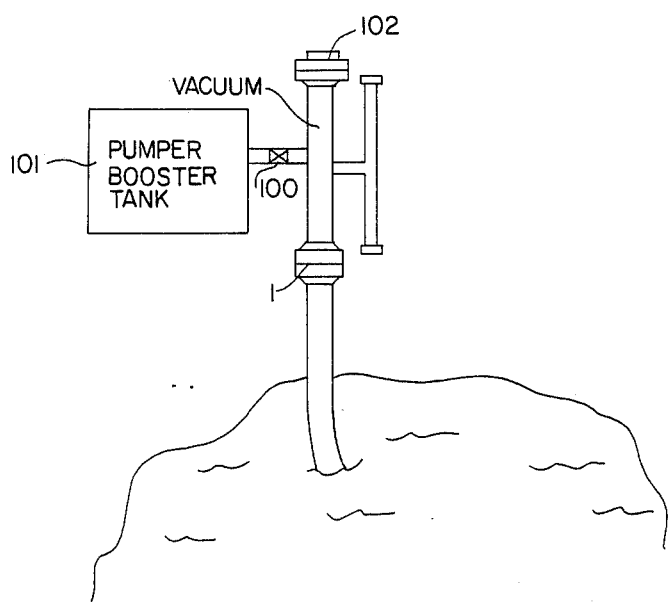

In FIG. 9a the connection to a reservoir of water tank is shown. As shown in FIG. 9b, the pumper operates the valve to pump as follows:

Working From Portable Tank Or Other Reservoir

1. Pump not shown is primed in a conventional manner. The valve will automatically open with about 4–8 inches of vacuum.

2. The valve will automatically open or close in proportion to water flow.

3. If water level in the reservoir portable tank gets low, open the booster tank valve 100. There is less flow resistance from the booster tank 101 and the valve 100 will automatically close—holding prime water in the suction hose.

4. When the water level is restored in the pond or portable tank, close the booster tank valve 101. This creates a vacuum in the pump and automatically opens the valve.

5. Using the boster tank as an emergency reservoir, you can switch back and forth from drafting to booster tank without disrupting water flow.

6. In the event all discharge lines are shut off, the valve 1 will automatically close to hold prime water in the suction hose.

Note: Auxilliary valve 102 must be in locked close position when creating a vacuum in pump suction.

EXAMPLE 2

Figure 9C:
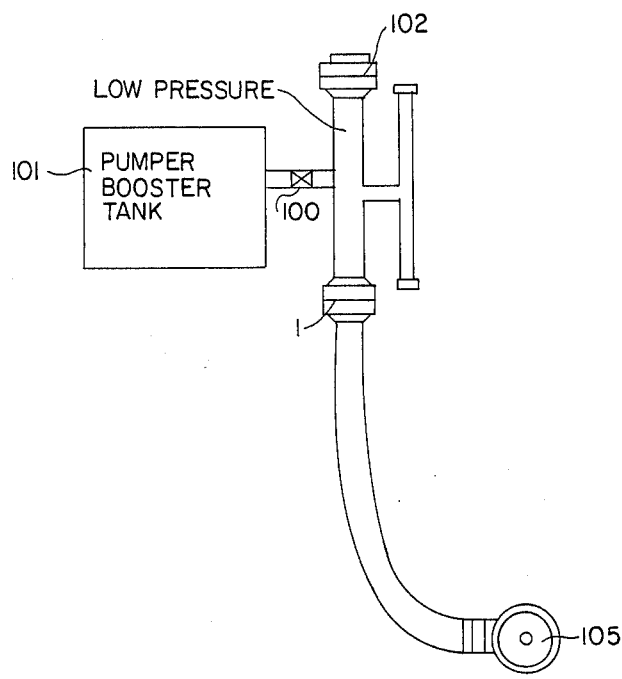

In FIG. 9c, the valve 102 is shown operated from a hydrant 105. This operation is as follows:

Working From Hydrant

1. When hydrant 105 is turned on, water pressure will automatically open valve. (Approximately 2 PSI.)

2. Valve 1 will open in proportion to flow demand. (Position of valve handle will change as discharge flow is increased or reduced.)

3. Valve 1 will automatically close if flow is shut off at pump discharge (Reducing "water hammer effects" in suction hose and fire hydrant.)

4. Bleeder 70 in valve 1 allows means to bleed off air or pressure in suction hose.

Note: Auxiliary valve 102 will remain closed due to low pressure in suction side of pump.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A check valve comprising:
 (a) a valve housing having an inlet opening, an outlet opening and a cavity of a predetermined size therein:
 (b) a valve element supported on a slidable stem member in a position for seating against said inlet opening for sealing said inlet opening closed;
 (c) valve element support means positioned in said cavity and having said slidable stem member extending therethrough, said support means having a shape complementing said valve element wherein said valve element seats against the valve element support means when in a fully open position, and having spring means interposed between the support means and valve element for bearing against said valve element and said valve element support means to urge said valve element into a closed position with a predetermined force, said spring means being shaped to progressively bear against the surface of said valve element and valve element support as the valve element is urged into a fully open position; and
 (d) scotch yoke locking means connected to said slidable stem member; the locking means including an operating member which extends outside of the housing and is moveable between first and second overcenter positions and an intermediate non-overcenter position, the locking means further including a slotted member having at least one closed end and a slider received in the slotted member; wherein the slotted member is on one of said stem and operating members, and the slider is on the other of said stem and operating members, and wherein the operating means locks the valve element in a fully closed condition when in the first overcenter position with the slider abutting the end of the slotted member, and the operating means locks the valve element in a fully open condition when in the second overcenter condition with the slider abutting the end of the slotted member; the valve element being in an unlocked free floating condition when said operating element is in the non-overcenter position with the slider spaced from the end of the slotted member.

2. A check valve according to claim 1 further comprising bleeder means in said valve housing opening on the inlet side outside said valve element for selectively bleeding out fluid from a conduit when connected to the check valve.

3. A check valve according to claim 2 wherein said bleeder means comprises a conduit extending through the valve housing and having a valve member therein for selectively opening and closing said conduit.

4. A check valve according to claim 1 wherein said locking means comprises a scotch yoke type mechanism.

5. A check valve according to claim 1 wherein said scotch yoke locking means further comprises:
 a stem attached at the end of said valve stem member and extending horizontally at substantially a right angle therefrom at the end thereof with the slot extending therethrough; a rotatable operating shaft extending into said cavity and having shaft member attached at the end thereof, said shaft member extending normally with respect to said stem; to overlap with said stem; and a sliding block slidable in said stem member slot and held therein by a pin operatively coupling said stem and said sliding block to said shaft member.

6. A check valve according to claim 5 wherein said operating shaft extends outside said housing and includes a lever secured thereto to facilitate rotating said shaft.

7. A check valve according to claim 5 wherein said operating shaft extends outside said housing and includes a lever secured thereto to facilitate rotation of said shaft.

8. A check valve according to claim 1 wherein said valve cavity has a cross-sectional area greater than the cross-sectional area of the valve element by an amount at least as great as the area of said inlet opening for avoiding restriction of the flow of fluids therethrough.

9. A check valve according to claim 1 wherein said valve element has a radius of curvature sufficient to sealingly seat against said inlet openings, and such as to prevent said valve element from being blown out of said valve housing as a result of a back pressure surge.

10. A check valve according to claim 9 wherein said valve element is made of cold rolled steel covered by a neoprene rubber sheath.

11. A check valve according to claim 1 wherein said valve element is thicker in the center region thereof than at the periphery, the center region having a substantially spherical surface and the periphery having a substantially frusto-conical surface.

12. A check valve according to claim 11 wherein said valve element is made of aluminum alloy and seals against its seat by means of an O-ring.

13. In combination, a check valve and a pumper truck type fire engine wherein the check valve is in a line connecting a pump in the fire engine to a source of water exterior of the fire engine, the check valve comprising:
 (a) a valve housing having an inlet opening for connection to the water source, an outlet opening for connection to the pump, and a cavity of a predetermined size therein:
 (b) a valve element supported on a slidable stem member in a position for seating against said inlet opening for sealing said inlet opening closed;
 (c) valve element support means positioned in said cavity and having said slidable stem member extending therethrough, said support means having a shape complementing said valve element wherein said valve element seats against the valve element support means when in a fully open position, and having spring means interposed between the support means and valve element for bearing against said valve element and said valve element support means to urge said valve element into a closed position with a predetermined force, said spring means being shaped to progressively bear against the surface of said valve element and valve element support as the valve element is urged into a fully open positon; and
 (d) scotch yoke locking means connected to said slidable stem member; the locking means including an operating member which extends outside of the housing and is moveable between first and second overcenter positions and an intermediate non-overcenter position, the locking means further including a slotted member having at least one closed end and a slider received in the slotted member; wherein the slotted member is on one of said stem and operating members, and the slider is on the other of said stem and operating members, and wherein the operating means locks the valve element in a fully closed condition when in the first overcenter position with the slider abutting the end of the slotted member, and the operating means locks the valve element in a fully open condition when in the second overcenter condition with the slider abutting the end of the slotted member; the valve element being in an unlocked free floating condition when said operating element is in the non-overcenter position with the slider spaced from the end of the slotted member.

* * * * *